(12) United States Patent
Bu et al.

(10) Patent No.: US 12,394,576 B2
(45) Date of Patent: Aug. 19, 2025

(54) CAPACITOR, MANUFACTURING METHOD THEREFOR, AND USE THEREOF

(71) Applicant: EVE ENERGY CO., LTD., Guangdong (CN)

(72) Inventors: Fang Bu, Guangdong (CN); Chuiyi Luo, Guangdong (CN); Yuan Zhu, Guangdong (CN); Zhongzhi Yuan, Guangdong (CN); Jianhua Liu, Guangdong (CN); Jincheng Liu, Guangdong (CN)

(73) Assignee: EVE ENERGY CO., LTD., Guangdong (CN)

( * ) Notice: Subject to any disclaimer, the term of this patent is extended or adjusted under 35 U.S.C. 154(b) by 100 days.

(21) Appl. No.: 17/928,865

(22) PCT Filed: Nov. 16, 2020

(86) PCT No.: PCT/CN2020/128953
§ 371 (c)(1),
(2) Date: Nov. 30, 2022

(87) PCT Pub. No.: WO2022/077686
PCT Pub. Date: Apr. 21, 2022

(65) Prior Publication Data
US 2023/0335348 A1 Oct. 19, 2023

(30) Foreign Application Priority Data

Oct. 16, 2020 (CN) .......................... 202011110770.3
Oct. 16, 2020 (CN) .......................... 202022310215.7

(51) Int. Cl.
*H01G 11/80* (2013.01)
*H01G 11/04* (2013.01)
(Continued)

(52) U.S. Cl.
CPC ............ *H01G 11/80* (2013.01); *H01G 11/04* (2013.01); *H01G 11/28* (2013.01); *H01G 11/50* (2013.01); *H01G 11/84* (2013.01)

(58) Field of Classification Search
None
See application file for complete search history.

(56) References Cited

U.S. PATENT DOCUMENTS

| 2002/0093783 A1* | 7/2002 | Bendale | ................. H01G 11/38 427/79 |
| 2009/0154062 A1* | 6/2009 | Yamada | ................. H01G 11/28 361/502 |

FOREIGN PATENT DOCUMENTS

| CN | 103078069 A | 5/2013 |
| CN | 105870452 A | 8/2016 |

(Continued)

OTHER PUBLICATIONS

First Chinese Office Action dated Jun. 27, 2024 issued in CN 202011110770.3.
(Continued)

*Primary Examiner* — Eric W Thomas
(74) *Attorney, Agent, or Firm* — HUNTON ANDREWS KURTH LLP

(57) ABSTRACT

The present application provides a capacitor, a manufacturing method therefor, and a use thereof. The capacitor comprises a housing (10), a cell located in the housing (10), and a sealing device located at an opening of the housing (10). The capacitor has good sealing performance and a high energy density, can discharge at a large rate at −50° C.-125° C., can be stored at 85° C.&85% RH, and meets the requirements of industrial IoT power supply.

15 Claims, 2 Drawing Sheets

(51) Int. Cl.
*H01G 11/28* (2013.01)
*H01G 11/50* (2013.01)
*H01G 11/84* (2013.01)

(56) References Cited

FOREIGN PATENT DOCUMENTS

| CN | 206076296 U | 4/2017 | | |
|---|---|---|---|---|
| CN | 106816575 A | 6/2017 | | |
| CN | 107658395 A | 2/2018 | | |
| CN | 107706362 A | 2/2018 | | |
| CN | 107749351 A | 3/2018 | | |
| CN | 108428867 A | 8/2018 | | |
| CN | 110660957 A | 1/2020 | | |
| CN | 210576045 U | 5/2020 | | |
| CN | 210576046 U | 5/2020 | | |
| CN | 111446487 A | 7/2020 | | |
| CN | 214279816 U | 9/2021 | | |
| JP | H08293295 A | 11/1996 | | |
| JP | H09147832 A | 6/1997 | | |
| JP | 2000077270 A | 3/2000 | | |
| JP | 2016122604 A | 7/2016 | | |
| WO | WO-2008059829 A1 | * | 5/2008 | ............ H01G 11/80 |
| WO | WO-2008096520 A1 | * | 8/2008 | ............ H01G 11/74 |

OTHER PUBLICATIONS

Request for the Submission of an Opinion dated Feb. 8, 2024 received in KR 10-2022-7045482.
Notice of Reasons for Refusal dated Oct. 27, 2023 received in JP 2022-575398.
International Search Report Dated Jul. 14, 2021 issued in PCT/CN2020/128953.
European extended Search Report dated Mar. 20, 2025 issued in EP 20957462.3.

* cited by examiner

CAPACITOR, MANUFACTURING METHOD THEREFOR, AND USE THEREOF

TECHNICAL FIELD

The present application belongs to the technical field of capacitors, and relates to a capacitor, a manufacturing method therefor, and use thereof.

BACKGROUND

With the development of electrochemical power source technology, capacitor technology that intersects secondary batteries and supercapacitors "internally" has the characteristics of high power density, high energy density, long cycle life, high charge and discharge efficiency and high safety. However, with the development of society, higher requirements for the energy density, operating temperature range, reliability and safety of the capacitor are put forward.

At present, although lithium-ion capacitors have been commercialized, their energy densities are limited to 8-10 Wh/kg, and most lithium-ion capacitors on the market can only discharge at −30° C.-60° C. In addition, most lithium-ion capacitors have a girdle structure, and in this case, the lithium-ion capacitor when stored at 85° C.&85% RH is prone to leakage and cannot meet the requirements of industrial Internet of Things (IoT) power supplies. Formulations and sealing performance of electrodes, as important factors affecting device performance, have become the focus of current research.

CN10763957A discloses a method of preparing a lithium-ion capacitor and a lithium-ion capacitor. The preparation method includes the following steps: positive electrode plate preparation: a positive electrode active material, a conductive agent and a binder are calendered into a positive electrode film, and the positive electrode film and a first current collector are combined and dried to form a positive electrode plate; negative electrode plate preparation: a negative electrode active material, a conductive agent and a binder are calendered to form a negative electrode film, and the negative electrode film and a second current collector are combined and dried to form a negative electrode plate; preset lithium source: a lithium source slurry are coated on the surface of the positive electrode plate, and the positive electrode plate is successively dried, rolled, cut, and dried under vacuum to prepare a preset lithium source composite positive electrode plate; lithium-ion capacitor manufacturing: the preset lithium source composite positive electrode plate, a separator and the negative electrode plate are prepared into a cell, the cell is filled into a housing, and an electrolyte is injected to prepare a lithium-ion capacitor; and lithium-ion capacitor activation: the lithium-ion capacitor is activated and left to age to obtain a lithium-ion capacitor. Although this invention improves the energy density of the lithium-ion capacitor, the process is complicated and the manufacturing cost is high.

CN20763945U discloses a high-sealing supercapacitor. The supercapacitor includes a supercapacitor main body. Two external connectors are fixedly connected above the supercapacitor main body. A protective casing surrounding four faces of the supercapacitor main body is fixedly installed outside the supercapacitor main body. The protective casing is inlaid and bonded with two first buffer plates and two second buffer plates that all are symmetrical about the center line of the protective casing. Each first buffer plate includes a hollow plate, an elastic block, a rubber plate, a folding belt and a first aluminum plate, the upper end of the hollow plate is movably installed with the elastic block, and two elastic blocks are fixedly connected into a whole through the rubber plate. Each second buffer plate includes a foam block, a plastic plate, an elastic plate and a second aluminum plate. For the high-sealing supercapacitor, the first buffer plates and the second buffer plates used in the capacitor can reduce the damage of the capacitor to the protective casing to improve the sealing performance, and function as a buffer when the capacitor failed and exploded, but cannot pass the 85° C.&85% RH 192 h storage test.

CN103078069A discloses a sealing member for a lithium-ion battery capacitor. The sealing member includes an upper pressing ring, a cap, an insulating spacer and a tab pressing ring and further includes a sealant and a cross-shaped pole. The upper pressing ring, the cap and the tab pressing ring are each provided with a through hole, and the central axis of the three through holes are the same. The sealant, the through hole of the cap and the upper and lower surfaces of the cap are of an integrated structure by injection molding. The sealant is provided with a through hole whose central axis is the same as the central axis of the through hole of the cap. The pole includes a pole large end, a pole small end and a pole transverse plate through which the pole large end and the pole small end are integrated with. The pole large end penetrates the through hole on the sealant and the through hole on the upper pressing ring and is riveted with the upper pressing ring. The pole small end penetrates the through hole on the tab pressing ring and is riveted with the tab pressing ring. The pole transverse plate is attached and connected to the bottom surface of the sealant. In this invention, the cap and the pole are sealed with the sealant, and the pole is sealed with the upper pressing ring and the cap in a riveting manner to achieve full sealing, thereby improving sealing performance. However, in a practical use process, the sealing effect of the sealing member still needs to be enhanced.

Based on the above-mentioned literatures, how to develop a capacitor that meets the requirements of industrial IoT power supply applications and has good sealing performance, high energy density, good rate capability and wide operating temperature range has become an urgent problem to be solved.

SUMMARY

The present application is to provide a capacitor, a manufacturing method therefor, and use thereof. The capacitor has good sealing performance and a high energy density, can discharge at a large rate at −50° C.-125° C., can be stored at 85° C.&85% RH, and meets the requirements of industrial IoT power supply.

To achieve the object, the present application adopts technical solutions described below.

In a first aspect, the present application provides a capacitor, especially a hybrid capacitor. The capacitor includes a housing, a cell located in the housing and a sealing device located at an opening of the housing. The sealing device is connected to the cell.

The sealing device includes a pole, and a metal ring and an insulating member are sequentially sleeved on the outer periphery of the pole from top to bottom.

A first annular engagement surface is provided downwardly from the top on the outer peripheral surface of the pole, a second annular engagement surface is provided downwardly from the top on the inner peripheral surface of the metal ring, and the first annular engagement surface and the second annular engagement surface are fitted to and engaged with each other.

A groove having an outward opening is provided along the radial direction of the insulating member, and a cap is provided in the groove.

In the present application, the sealing device is provided with the first annular engagement surface on the outer periphery of the pole and is provided with the second annular engagement surface on the inner periphery of the metal ring, and the first annular engagement surface and the second annular engagement surface are engaged with each other to form an engagement structure, thereby enhancing the sealing effect and improving the sealing performance of the sealing device. The cooperation of the metal ring, the pole, the insulating member and the cap improves the sealing performance of the sealing device and achieves the full sealing of the capacitor, and the full sealing performance of the capacitor is less than $1.0 \times 10^{-6}$ Pa·m²/s (helium mass spectrometry) so that the capacitor can be stored at 85° C.&85% RH and meets the requirements of the industrial IoT power supply.

It is to be noted that the specific shape of the first annular engagement surface and the second annular engagement surface is not limited to the present application and optionally, may be, but is not limited to, a stepped engagement structure. Of course, it is to be understood that other forms of engagement structures are applicable to the present application, such as a mutually fitted curved (wave-like) engagement structure, a serrated engagement structure and the like.

In the present application, the type of the capacitor is not specifically limited, and the capacitor may be an electric double-layer capacitor or a hybrid capacitor. Any capacitor is applicable to the present application as long as it is a type well known to those skilled in the art.

In the present application, the method for providing the groove is not particularly limited and may be a laser configuration or injection molding. Any method is applicable to the present application as long as it is a method commonly used by those skilled in the art.

As an optional technical solution of the present application, a material of the pole includes metal whose redox potential is higher than the redox potential of iron and/or alloy, optionally is any one or a combination of at least two of aluminum, molybdenum, aluminum alloy or molybdenum alloy, further optionally aluminum alloy and/or molybdenum alloy.

In the present application, the pole is prepared using electrolytic corrosion-resistant metal and/or alloy to improve the electrical conductivity. Further, the pole is optionally prepared using aluminum alloy and/or molybdenum alloy, and the aluminum alloy and/or molybdenum metal belong to a composite pole that is oxidized-resistant and has a high potential.

Optionally, a material of the insulating member includes any one or a combination of at least two of insulating ceramics, an insulating paint or mica, optionally insulating ceramics.

Optionally, a material of the metal ring includes any one or combination of at least two of aluminum alloy, stainless steel alloy or molybdenum alloy, optionally any one or combination of at least two of 304 stainless steel alloy, 316 stainless steel alloy or 316L stainless steel alloy.

As an optional technical solution of the present application, the pole includes a pole body and a base fixed at the bottom of the pole.

Optionally, the pole body and the base are integrally shaped.

In the present application, the pole body and the base are fixed and integrally shaped in an inverted T shape so that the engagement between the pole, the metal ring and the insulating member can be improved, thereby improving the sealing performance.

Optionally, an annular protrusion is provided on the upper end surface of the base, and an annular groove matching the position of the annular protrusion is provided on the lower end surface of the insulating member.

In the present application, the engagement between the annular protrusion and the annular groove forms a tight engagement structure so that the sealing effect can be enhanced, thereby improving the sealing performance between the pole and the insulating member. It is to be noted that the number of the annular protrusions is not particularly limited to the present application, and the annular protrusions may be arranged continuously or arranged at intervals.

Optionally, a first annular protrusion is provided on a side, towards the insulating member, of the outer peripheral surface of the base, a first connection member is provided along the outer periphery of the first annular protrusion, and the base is fixed with the insulating member through the first connection member.

In the present application, the provision of the first connection member at the connection between the base and the outer edge of the insulating member can further improve the sealing effect between the base and the insulating member. It is to be noted that in the present application, the base and the insulating member are welded and fixed through the first connection member, and of course, the base and the insulating member may be directly welded and fixed without using the first connection member. If the base and the insulating member are welded and fixed through the first connection member, a first annular protrusion structure should be provided at the contact position between the base and the insulating member, and the first connection member should be arranged around the first annular protrusion.

Optionally, a fixing manner of the base and the insulating member includes welding and/or sticking.

In the present application, the base and the insulating member are sealed through multiple connections, further improving the sealing performance of the capacitor.

Optionally, the lower end surface of the base is connected to the cell, and the connecting manner optionally includes any one or a combination of at least two of laser welding, ultrasonic welding or twist welding.

As an optional technical solution of the present application, the first annular engagement surface and the second annular engagement surface each have a stepped structure.

In the present application, the first annular engagement surface and the second annular engagement surface are fitted to each other to form a stepped engagement structure, and the stepped multiple welding can enhance the sealing effect.

Optionally, the number of steps of the first annular engagement surface is greater than or equal to 1 and for example, may be 2, 3, 4, 6, 8 or 10, optionally 1-10.

Optionally, the number of steps of the second annular engagement surface is greater than or equal to 1 and for example, may be 2, 3, 4, 6, 8 or 10, optionally 1-10.

Optionally, the number of steps of the second annular engagement surface is equal to the number of steps of the first annular engagement surface.

Optionally, the first annular engagement surface is fixedly connected to the second annular engagement surface in a manner of fusion welding after the first annular engagement surface and the second annular engagement surface are fitted to and engaged with each other.

Optionally, a second annular protrusion is provided on a side, towards the insulating member, of the outer peripheral surface of the metal ring, a second connection member is provided along the outer periphery of the second annular protrusion, and the metal ring is fixedly connected to the insulating member through the second connection member.

In the present application, the provision of the second connection member at the connection between the metal ring and the outer edge of the insulating member can further improve the sealing effect between the metal ring and the insulating member. It is to be noted that in the present application, the metal ring and the insulating member are welded and fixed through the second connection member, and of course, the metal ring and the insulating member may be directly welded and fixed without using the second connection member. If the metal ring and the insulating member are welded and fixed through the second connection member, a second annular protrusion structure should be provided at the contact position between the metal ring and the insulating member, and the second connection member should be arranged around the second annular protrusion.

Optionally, a fixedly connecting manner of the metal ring and the insulating member includes welding.

Optionally, a fixedly connecting manner of the insulating member and the pole includes welding.

Optionally, a third annular protrusion is provided on a side, towards the cap, of the outer peripheral surface of the insulating member, a third connection member is provided along the outer periphery of the third annular protrusion, and the insulating member is fixed with the cap through the third connection member.

It is to be noted that the connection between the insulating member and the cap includes that both side surfaces of the insulating member are in contact with the upper end surface of the cap and the lower end surface of the cap, respectively.

Optionally, a thickness of a portion, extending into the groove of the insulating member, of the cap is greater than the thickness of a remaining portion of the cap.

In the present application, the provision of the third connection member at the connection between the cap and the outer edge of the insulating member can further improve the sealing effect between the cap and the insulating member. It is to be noted that in the present application, the cap and the insulating member are welded and fixed through the third connection member, and of course, the cap and the insulating member may be directly welded and fixed without using the third connection member. If the cap and the insulating member are welded and fixed through the third connection member, a third annular protrusion structure should be provided at the contact position between the cap and the insulating member, and the third connection member should be arranged around the third annular protrusion.

It is to be noted that the material of the first connection member, the second connection member and the third connection member is not specifically limited to the present application and may be a metal material, and any connection member capable of achieving the sealing effect is applicable to the present application as long as it is commonly used by those skilled in the art.

Optionally, a fixing manner of the cap and the insulating member includes welding.

Optionally, the upper end surface of the cap is flush with the upper end surface of the housing.

Optionally, an outer rim that is folded towards the opening of the housing is provided on the peripheral outer edge of the cap, and the outer rim is attached to the opening of the housing.

In the present application, the provision of the outer rim can enable the outer edge of the cap to be better attached to the opening of the housing, thereby facilitating the improvement of the sealing performance and, in particular, facilitating the connection by welding.

Optionally, a height of the outer rim is 0.02-0.08 mm and for example, may be 0.02 mm, 0.04 mm, 0.06 mm or 0.08 mm.

Optionally, the sealing device further includes a false head, and the false head is provided on the upper end surface of the pole and is connected to the pole and the metal ring respectively.

As an optional technical solution of the present application, the cell includes a positive electrode plate and a negative electrode plate.

Optionally, the positive electrode includes a positive electrode current collector, a bonding layer and a positive electrode material layer, where the bonding layer and the positive electrode material layer are sequentially located on the surface of the positive electrode current collector.

Optionally, the bonding layer includes a first binder, and the positive electrode material layer includes a second binder, a conductive agent, a positive electrode active material and a lithium-rich compound.

As an optional technical solution of the present application, a thickness of the bonding layer is 0.5-10 μm and for example, may be 0.5 μm, 1 μm, 2 μm, 4 μm, 6 μm, 8 μm, 9 μm or 10 μm, optionally 1-5 μm. If the thickness is less than 0.5 μm, the bonding force of the conductive bonding layer to the powder is relatively small so that the resistance of the electrode plate cannot be effectively reduced and the powder cannot be prevented from falling off. If the thickness is larger than 10 μm, the thickness of the electrode plate is relatively large, which does not facilitate the improvement of the energy density of the device.

Optionally, the conductive agent includes a first conductive agent and a second conductive agent, the first conductive agent includes at least one of graphite powder, conductive carbon black or acetylene black, and the second conductive agent includes at least one of a graphene-based material and a one-dimensional carbon material.

In the positive electrode material layer provided in the present application, the graphene-based material and/or the one-dimensional carbon material constitute a three-dimensional stereo conductive network, and at least one of graphite powder, conductive carbon black or acetylene black is dispersed inside and/or on the surface of the conductive network to form a perfect conductive system, thereby improving the conductivity of the material.

Optionally, the positive electrode active material includes a lithium-containing positive electrode active material and a carbon-based positive electrode active material.

Optionally, the lithium-containing positive electrode active material includes any one or a combination of at least two of lithium cobaltate, lithium nickelate, lithium manganate, lithium iron phosphate, a nickel-cobalt-manganese ternary material, a nickel-cobalt-aluminum ternary material or a nickel-cobalt-manganese-aluminum quaternary material, optionally any one or a combination of at least two of lithium nickelate, a nickel-cobalt-manganese ternary material, a nickel-cobalt-aluminum ternary material or a nickel-cobalt-manganese-aluminum quaternary material.

Optionally, the carbon-based positive electrode active material includes any one or a combination of at least two of activated carbon, graphene, doped graphene or porous biochar.

In the present application, the carbon-based positive electrode active material has a large specific surface area, generally 1500 $m^2/g$ or more, for example, 1500 $m^2/g$, 1600 m²/g, 1700 m²/g, 1800 m²/g, 2000 m²/g or 2100 m²/g, and the carbon-based positive electrode active material can be mixed with the lithium-containing positive electrode active material to improve the energy density of the capacitor.

Optionally, the conductive carbon black includes small-particle conductive carbon black having a particle size of 10-200 nm and/or large-particle conductive carbon black having a particle size of 1-30 μm. For example, the particle size of the small-particle conductive carbon black may be 10 nm, 15 nm, 20 nm, 50 nm, 80 nm, 100 nm, 120 nm, 150 nm, 180 nm, 190 nm or 200 nm, and the particle size of the large-particle conductive carbon black may be 1 μm, 3 μm, 5 μm, 10 μm, 15 μm, 20 μm, 25 μm, 28 μm or 30 μm.

In the present application, the type of the small-particle conductive carbon black or the large-particle conductive carbon black is not specifically limited and may be an SP, and any substance is applicable to the present application as long as it is commonly used by those skilled in the art.

Optionally, the graphene-based material includes any one or a combination of at least two of graphene, oxidized graphene or doped graphene.

Optionally, the one-dimensional carbon material includes carbon nanotube and/or carbon fiber.

Optionally, in the positive electrode material layer, the mass ratio of the graphene-based material to the one-dimensional carbon material is (1-2):(3-6). At such a ratio, a superconductive network can be formed in the positive electrode material layer so that an excellent conductivity is obtained. The mass ratio may be, for example, 1:3, 1:4, 1:5, 1:6, 2:3, 2:5 or 2:6. If the mass fraction is less than 1:6, it is difficult for the positive electrode to construct a three-dimensional conductive network. If the mass fraction is greater than 2:3, the dispersion of the graphene-based material is difficult, and the internal resistance of the device is increased. It will be readily appreciated that the graphene-based material may be a constituent part of the second conductive agent or may be a constituent part of the carbon-based positive electrode active material, and the graphene-based material is included in the preceding content range as long as it is in the positive electrode material layer.

Optionally, the first binder and the second binder are fusible fluorocarbon resin.

Optionally, the first binder and the second binder are independently selected from any one or a combination of at least two of PVDF, PTFE or PFA, and typical but non-limiting combinations include a combination of PVDF and PFA and a combination of PFA and PTFE.

Optionally, the lithium-rich compound includes any one or a combination of at least two of $Li_2NiO_2$, $LiSFeO_4$, $Li_3N$, $Li_2O$, $Li_2O_2$ or M/fluorine lithium composition, where M includes any one or a combination of at least two of Co, Ni or Fe, optionally any one or a combination of at least two of $Li_2NiO_2$, $Li_3N$ or M/fluorine lithium composition. Typical but non-limiting combinations include a combination of $Li_2NiO_2$ and $LiSFeO_4$, a combination of $Li_3N$ and $Li_2O$, a combination of $Li_2O$ and $Li_2O_2$, a combination of $Li_3N$, $Li_2O$ and $Li_2O_2$, a combination of $Li_2NiO_2$ and Ni/fluorine lithium composition, and any one or a combination of at least two of $Li_2NiO_2$, $Li_3N$ or M/fluorine lithium composition.

The "M/fluorine lithium composition" is a composition of metal M and fluorine lithium.

As an optional technical solution of the present application, the bonding layer further includes a third conductive agent, and the third conductive agent is optionally conductive carbon black.

Optionally, a total mass fraction of the first binder and the second binder is 2%-10% based on the total mass of the bonding layer and the positive electrode material layer being 100%, and for example, may be 2%, 3%, 5%, 6%, 8% or 10%.

The ratio of the first binder to the second binder is not particularly limited and can be selected by those skilled in the art as required.

Optionally, a mass fraction of the first conductive agent is 1%-6% based on the total mass of the bonding layer and the positive electrode material layer being 100%, and for example, may be 1%, 2%, 3%, 4%, 5% or 6%.

Optionally, a total mass fraction of the graphene-based material to the one-dimensional carbon material is 0.5%-3% based on the total mass of the bonding layer and the positive electrode material layer being 100%, and for example, may be 0.5%, 1%, 2%, 2.5% or 3%. If the mass fraction is less than 0.5%, the low temperature rate capability of the device is affected. If the mass fraction is greater than 3%, the internal resistance of the device is increased, and the electrical performance is affected. It will be readily appreciated that the graphene-based material may be a constituent part of the second conductive agent or may be a constituent part of the carbon-based positive electrode active material, and the graphene-based material is included in the preceding content range as long as it is in the positive electrode material layer.

Optionally, a mass ratio of the third conductive agent to the first binder is (1-5):1 and for example, may be 1:1, 2:1, 3:1, 4:1 or 5:1, optionally (2-4):1.

Optionally, a mass fraction of the lithium-containing positive electrode active material is 5%-80% based on the total mass of the bonding layer and the positive electrode material layer being 100%, and for example, may be 5%, 10%, 15%, 20%, 30%, 40%, 50%, 60%, 70% or 80%.

Optionally, a mass fraction of the carbon-based positive electrode active material is 10%-90% based on the total mass of the bonding layer and the positive electrode material layer being 100%, and for example, may be 10%, 20%, 25%, 30%, 40%, 50%, 60%, 70%, 80% or 90%.

Optionally, a mass fraction of the positive electrode active material is 85%-95% based on the total mass of the bonding layer and the positive electrode material layer being 100%, and for example, may be 85%, 88%, 90%, 92%, 93% or 95%.

Optionally, a mass ratio of the lithium-containing positive electrode active material to the carbon-based positive electrode active material is 1:(0.5-1.5), for example, 1:0.5, 1:0.8, 1:0.9, 1:1, 1:1.2, 1:1.3 or 1:1.5, optionally 1:1-1:1.2.

Optionally, a mass fraction of the lithium-rich compound is 2%-30% based on the total mass of the bonding layer and the positive electrode material layer being 100%, and for example, may be 2%, 3%, 5%, 10%, 15%, 20%, 25% or 30%. If the mass fraction is less than 2%, the capacitance and the discharge median voltage of the device are low. If the mass fraction is greater than 30%, the cost of the raw material of the device is increased.

As an optional technical solution of the present application, the negative electrode plate includes a negative electrode current collector and a negative electrode material layer on the surface of the negative electrode current collector.

Optionally, the negative electrode material layer includes a binder, a conductive agent and a negative electrode active material.

Optionally, the negative electrode active material in the negative electrode material layer includes any one or a combination of at least two of graphite, amorphous carbon, silicon-carbon, silicon-oxygen, lithium titanate, graphene, tin oxide or tin alloy.

Optionally, the binder in the negative electrode material layer includes any one or a combination of at least two of PVDF, PTFE or an acrylonitrile multicomponent copolymer.

In a second aspect, the present application provides a manufacturing method for the capacitor described in the first aspect. The method includes the following steps:

(1) mixing a second binder, a conductive agent, a positive electrode active material and a lithium-rich compound to obtain a positive electrode slurry, wherein the conductive agent comprises a first conductive agent and a second conductive agent, the first conductive agent comprises at least one of graphite powder, conductive carbon black or acetylene black, and the second conductive agent comprises at least one of a graphene-based material and a one-dimensional carbon material;

(2) coating a dispersion liquid containing a first binder on the surface of a positive electrode current collector, performing a first baking to prepare a bonding layer, coating the positive electrode slurry obtained in step (1) on the surface of the bonding layer, performing a second baking to obtain an intermediate product, rolling the intermediate product, and performing a third baking on the intermediate product to obtain a positive electrode plate;

(3) mixing a negative electrode active material, a solvent, a binder, a conductive agent, a weak acid and an alcohol to obtain a negative electrode slurry, coating the negative electrode slurry on the surface of a negative electrode current collector, and performing baking to obtain a negative electrode plate;

the weak acid comprises any one or a combination of at least two of oxalic acid, acetic acid or citric acid;

the alcohol comprises any one or a combination of at least two of isopropanol, isobutanol or ethylene glycol;

(4) preparing the positive electrode plate and the negative electrode plate into a cell, loading the cell into a casing, injecting an electrolyte, and sealing the cell using a sealing device to obtain the capacitor.

According to the manufacturing method provided in the present application, the dispersion liquid containing the first binder is coated on the surface of the positive electrode current collector, and the positive electrode current collector is rolled and baked so that the binding of each substance to the current collector in the positive electrode is more compact, thereby reducing the internal resistance of the electrode plate and improving the high-power charge/discharge performance; the first conductive agent and the second conductive agent may construct a three-dimensional conductive network; the lithium-rich oxide and the positive electrode active material provide lithium ions to enter the negative electrode during the charging process to perform lithium intercalation so that the negative electrode is free from pre-lithiation, thereby simplifying the process, reducing the production cost, and obtaining high application value. Lithium ions in the lithium-rich compound and positive electrode active material in the positive electrode material layer can be discharged into the negative electrode during the charging process to enable the negative electrode to free from pre-lithium intercalation so that the fabrication process of the hybrid capacitor is simple and the cost is low. Meanwhile, the energy density and the rate capability are improved, the rate capability includes a room temperature rate capability and a low-temperature rate capability, and the rate capability includes a room temperature rate capability, a high-temperature rate capability and a low-temperature rate capability, thereby meeting the requirements of the IoT power supply.

The mixing method of the positive electrode slurry described in step (1) is not specifically limited to the present application, and may be one-step mixing or multi-step mixing such as two-step mixing, three-step mixing and four-step mixing, and those skilled in the art can prepare the positive electrode slurry as required. Optionally, substances other than the graphene-based material are dry blended to obtain mixed powder, the graphene-based material is mixed with the mixed powder, and an organic solvent is added to the mixture and mixed evenly to obtain the positive electrode slurry. In the present application, the type of the organic solvent is not specifically limited, an any solvent is applicable to the present application as long as it is commonly used by those skilled in the art.

Optionally, the positive electrode current collector in step (2) includes any one of an etched current collector, a coated current collector, a pure current collector or a through-hole current collector.

Optionally, in the dispersion in step (2), a mass fraction of the binder is 1%-10%, for example, 1%, 3%, 5%, 8%, 9% or 10%, optionally 2%-8%.

Optionally, the dispersion liquid in step (2) further includes a third conductive agent.

Optionally, a temperature of the first baking in step (2) is 60° C.-180° C. and for example, may be 60° C., 70° C., 75° C., 80° C., 85° C., 90° C., 100° C., 120° C., 140° C., 160° C., 170° C. or 180° C., optionally 80° C.-150° C. If temperature is lower than 60° C., the organic solvent cannot be baked dry. If the temperature is higher than 180° C., the electrode plate may crack.

Optionally, a thickness of the bonding layer in step (2) is 0.5-10 μm and for example, may be 0.5 μm, 1 μm, 2 μm, 4 μm, 6 μm, 8 μm, 9 μm or 10 μm, optionally 1-5 μm. If thickness is less than 0.5 μm, the bonding force of the conductive bonding layer to the powder is relatively small so that the resistance of the electrode plate cannot be effectively reduced and the powder cannot be prevented from falling off. If the thickness is larger than 10 μm, the thickness of the electrode plate is relatively large, which does not facilitate the improvement of the energy density of the device.

Optionally, a temperature of the second baking in step (2) is 80° C.-150° C. and for example, may be 80° C., 85° C., 90° C., 100° C., 110° C., 120° C., 130° C., 140° C. or 150° C., optionally 100° C.-130° C. If temperature is lower than 80° C., the residual solvent and moisture on the electrode plate cannot be remove. If the temperature is higher than 150° C., the electrode plate is overbaked, and powder may be dropped.

Optionally, a rate of the rolling in step (2) is 2-50 m/min and for example, may be 2 m/min, 5 m/min, 10 m/min, 20 m/min, 25 m/min, 30 m/min, 35 m/min, 40 m/min, 45 m/min, 48 m/min or 50 m/min. If the rate is slower than 2 m/min, the electrode plate is inefficient in production. If the rate is faster than 50 m/min, the bonding layer and the slurry cannot be bound well.

Optionally, the rolling in step (2) is cold pressing and/or hot pressing.

Optionally, a temperature of the cold pressing is 0° C.-45° C. and for example, may be 0° C., 5° C., 10° C., 15° C., 20° C., 30° C., 40° C. or 45° C.

Optionally, a temperature of the hot pressing is 60° C.-270° C. and for example, may be 60° C., 70° C., 80° C., 90° C., 100° C., 110° C., 120° C., 130° C., 140° C., 160° C., 180° C., 190° C., 200° C., 230° C., 250° C. or 270° C., optionally 80° C.-250° C. If temperature is lower than 60° C., the binder in the bonding layer cannot be hot-melt, which is not conducive to the generation of the bonding force. If the temperature is higher than 270° C., the structure of the binder may be damaged.

Optionally, a manner of the third baking in step (2) includes vacuum baking.

Optionally, a vacuum degree of the vacuum baking is 5-200 Pa and for example, may be 5 Pa, 10 Pa, 15 Pa, 20 Pa, 50 Pa, 80 Pa, 100 Pa, 150 Pa, 180 Pa or 200 Pa.

Optionally, a temperature of the third baking in step (2) is 80° C.-150° C. and for example, may be 80° C., 90° C., 100° C., 110° C., 120° C., 130° C., 135° C., 140° C., 145° C. or 150° C.

Optionally, a time of the third baking in step (2) is 10-60 min and for example, may be 10 min, 20 min, 30 min, 40 min, 50 min or 60 min.

Optionally, in the process of steps (1) and (2), an ambient temperature is controlled to be 20° C.-30° C., and the humidity is controlled to be 3%-40%. For example, the temperature may be 0° C., 22° C., 25° C., 26° C., 28° C. or 30° C., and the humidity may be 3%, 5%, 8%, 10%, 15%, 20%, 25%, 30%, 35% or 40%.

Optionally, in step (3), a mass fraction of the negative electrode active material is 40%-45%, for example, 40%, 41%, 42% or 45%, a mass fraction of the binder is 1.2%-3%, for example, 1.2%, 1.5%, 1.8%, 2%, 2.5% or 3%, a mass fraction of the conductive agent is 1.5%-3%, for example, 1.5%, 1.8%, 2.1%, 2.4%, 2.7% or 3%, a mass fraction of the weak acid is 0.1%-0.2%, for example, 0.1%, 0.12%, 0.14% or 0.2%, a mass fraction of the alcohol is 0.2%-0.3%, for example, 0.2%, 0.24% or 0.3%, and a mass fraction of the solvent is 45%-60%, for example, 45%, 50%, 5% or 60%, based on the total mass of the negative electrode slurry being 100%.

In a third aspect, the present application provides use of the capacitor described in the first aspect in industrial Internet of Things.

Compared with the existing art, the present application has at least the beneficial effects described below.

(1) For the capacitor provided in the present application, with the use of the sealing device, full sealing is achieved, and the full sealing performance is less than $1.0 \times 10^{-6}$ Pa·m$^2$/s (helium mass spectrometry) so that the capacitor has excellent sealing performance and can be stored at 85° C.&85% RH.

(2) According to the manufacturing method for the capacitor provided in the present application, the combination of each substance of the positive electrode and the positive electrode current collector is improved through the arrangement of the bonding layer in the positive electrode plate, the conductive agent can construct a three-dimensional stereo conductive network to improve the conductivity and facilitate the transmission of lithium ions, and the lithium-rich oxide and the positive electrode active material provide lithium ions to enter the negative electrode during the charging process to perform lithium intercalation so that the negative electrode is free from the pre-lithiation. Therefore, the capacitor has a high energy density, a wide operating temperature range and charge/discharge performance at high rate.

(3) According to the manufacturing method for the capacitor provided in the present application, the use of an alcohol in the negative electrode reduces the polarity of the binder, improves the compatibility of the negative electrode active substance and the binder, and catalyzes the net crosslinking of the binder to improve the bonding strength so that the surface of the negative electrode plate of the prepared capacitor is uniformly dispersed and the peel force is high ($\geq 0.09$ N); the use of the positive electrode plate and/or the negative electrode plate improves the ultimate operating temperature performance of the capacitor so that the capacitor can discharge at high rate at −50° C.-125° C., among which, at −50° C., the pulse at 150 C rate for 0.1 s, and the lowest voltage is 1.9 V or more, the capacitor has characteristics of long lifetime and a wide operating temperature range and can meet the requirements of the industrial IoT power supply.

Figure 1:
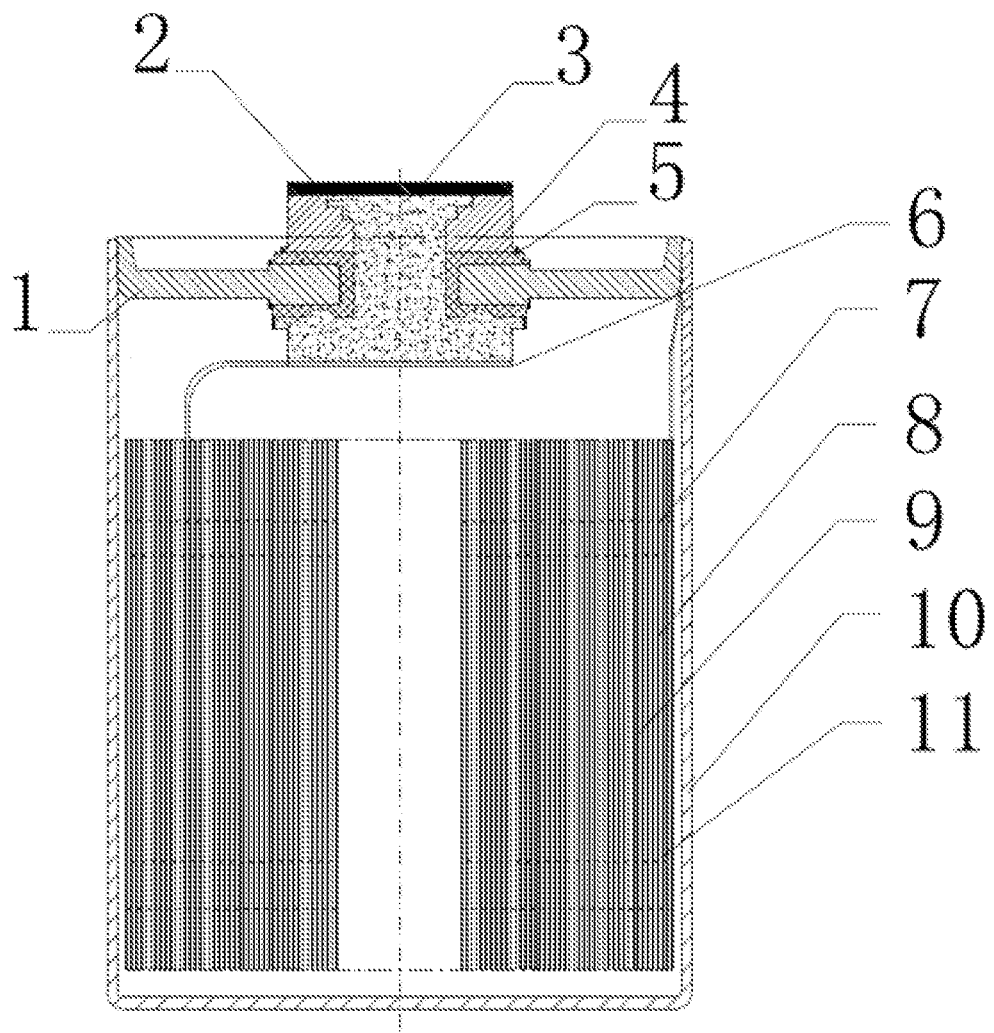
FIG. 1 is a sectional view of a capacitor provided in the present application.
Figure 2:
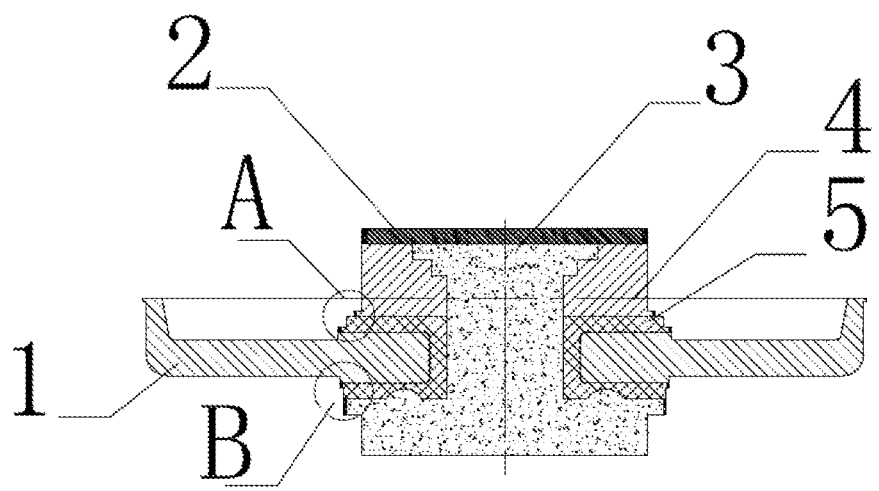
FIG. 2 is a sectional view of a sealing device of a capacitor provided in the present application.
Figure 3:
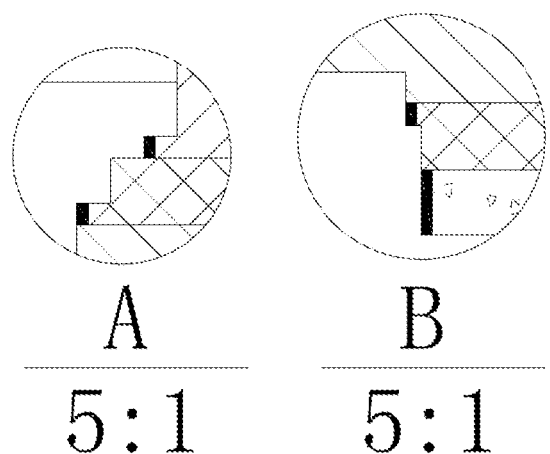
FIG. 3 is a partial enlarged sectional view of a sealing device of a capacitor provided in the present application.

In the drawings, 1—cap; 2—false head; 3—pole; 4—metal ring; 5—insulating member; 6—positive electrode tab; 7—negative electrode tab; 8—separator; 9—negative electrode plate; 10—housing; 11—positive electrode plate.

DETAILED DESCRIPTION

It is to be understood that in the description of the present application, orientations or position relations indicated by terms such as "center", "longitudinal", "lateral", "upper", "lower", "front", "back", "left", "right", "vertical", "horizontal", "top", "bottom", "in" and "out" are based on orientations or positional relationships shown in the drawings. These orientations or position relations are intended to facilitate and simplify the description of the present application and not to indicate or imply that a device or element referred to must have a particular orientation or must be constructed or operated in a particular orientation. Thus, these orientations or position relations are not to be construed as limiting the present application. In addition, terms such as "first" and "second" are used herein for purposes of description and are not to be construed as indicating or implying relative importance or implicitly indicating the number of technical features as indicated. Thus, a feature defined as a "first" feature or a "second" feature may explicitly or implicitly include one or more of such features. In the description of the present application, unless otherwise noted, the term "a plurality of" or "multiple" means two or more.

It is to be noted that in the description of the present application, unless otherwise expressly specified and limited, the term "mounted", "connected to each other" or "connected" should be construed in a broad sense, such as securely connected, detachably connected or integrally connected; mechanically connected or electrically connected; directly connected to each other or indirectly connected to each other via an intermediary; or intraconnected between two components. For those of ordinary skill in the art, specific meanings of the preceding terms in the present application may be construed according to specific circumstances.

The technical solutions of the present application are further described hereinafter through embodiments in conjunction with the drawings.

In an embodiment, the present application provides a capacitor as shown in FIG. 1. The capacitor includes a housing 10, a cell located in the housing 10, and a sealing device located at an opening of the housing 10. The sealing device is connected to the cell. The sealing device includes a pole 3, and a metal ring 4 and an insulating member 5 are sequentially sleeved on the outer periphery of the pole 3 from top to bottom. A groove having an outward opening is provided along the radial direction of the insulating member 5, and a cap 1 is provided in the groove.

A first annular engagement surface is provided downwardly from the top on the outer peripheral surface of the pole 3, a second annular engagement surface is provided downwardly from the top on the inner peripheral surface of the metal ring 4, and the first annular engagement surface and the second annular engagement surface are fitted to and engaged with each other. The first annular engagement surface is fixedly connected to the second annular engagement surface in a manner of fusion welding after the first annular engagement surface and the second annular engagement surface are fitted to and engaged with each other.

The first annular engagement surface and the second annular engagement surface are engaged with each other to form an engagement structure. Meanwhile, the cooperation of the metal ring 4, the pole 3, the insulating member 5 and the cap 1 improves the sealing performance of the sealing device and achieves the full sealing of the capacitor, and the full sealing performance of the capacitor is less than $1.0 \times 10^{-6}$ Pa·m$^2$/s (helium mass spectrometry) so that the capacitor can be stored at 85° C.&85% RH and meets the requirements of the industrial IoT power supply.

Specifically, the first annular engagement surface and the second annular engagement surface each have a stepped structure. Further, the number of steps of the first annular engagement surface is greater than or equal to 1, and the number of steps of the second annular engagement surface is equal to the number of steps of the first annular engagement surface.

The stepped multiple welding can further enhance the sealing effect and improve the sealing performance of the sealing device.

It is to be noted that the specific shape of the first annular engagement surface and the second annular engagement surface is not limited to this embodiment and optionally, may be, but is not limited to, a stepped engagement structure. Of course, it is to be understood that other forms of engagement structures are applicable to the present application, such as a mutually fitted curved (wave-like) engagement structure, a serrated engagement structure and the like.

The pole 3 includes a pole body and a base fixed at the bottom of the pole, and the pole 3 and the base are integrally shaped in an inverted T shape. An annular protrusion is provided on the upper end surface of the base, and an annular groove matching the position of the annular protrusion is provided on the lower end surface of the insulating member 5. The engagement between the annular protrusion and the annular groove forms a tight engagement structure so that the sealing effect can be enhanced, thereby improving the sealing performance between the pole 3 and the insulating member 5. It is to be noted that the annular protrusion defined in the present application may be a complete circle of annular protrusions or may be a ring formed by several protrusions distributed at intervals. Of course, the number of the preceding annular protrusions is not particularly limited, and the annular protrusions may be arranged continuously or arranged at intervals.

A first annular protrusion is provided on a side, towards the insulating member 5, of the outer peripheral surface of the base, a first connection member is provided along the outer periphery of the first annular protrusion, and the base is fixed with the insulating member 5 through the first connection member. In this embodiment, the base and the insulating member 5 are welded and fixed through the first connection member, and of course, the base and the insulating member 5 may be directly welded and fixed without using the first connection member. If the base and the insulating member 5 are welded and fixed through the first connection member, a first annular protrusion structure should be provided at the contact position, and the first connection member should be arranged around the first annular protrusion.

The lower end surface of the base is connected to the cell, and the connecting manner optionally includes laser welding, ultrasonic welding or twist welding.

A second annular protrusion is provided on a side, towards the insulating member 5, of the outer peripheral surface of the metal ring 4, a second connection member is provided along the outer periphery of the second annular protrusion, and the metal ring 4 is fixedly connected to the insulating member 5 through the second connection member. The provision of the second connection member at the connection between the metal ring 4 and the outer edge of the insulating member 5 can further improve the sealing effect between the metal ring 4 and the insulating member 5. Further, the fixing manner of the metal ring 4 and the insulating member 5 includes welding. In this embodiment, optionally, the metal ring 4 and the insulating member 5 are welded and fixed through the second connection member, and of course, the metal ring 4 and the insulating member 5 may be directly welded and fixed without using the second connection member. If the metal ring 4 and the insulating member 5 are welded and fixed through the second connection member, a second annular protrusion structure should be provided at the contact position, and the second connection member should be arranged around the second annular protrusion.

A third annular protrusion is provided on a side, towards the cap 1, of the outer peripheral surface of the insulating member 5, a third connection member is provided along the outer periphery of the third annular protrusion, and the insulating member 5 is fixed with the cap 1 through the third connection member. The provision of the third connection member at the connection between the cap 1 and the outer edge of the insulating member 5 can further improve the sealing effect between the cap 1 and the insulating member 5. Further, the fixing manner of the cap 1 and the insulating member 5 includes welding. In this embodiment, optionally, the cap 1 and the insulating member 5 are welded and fixed through the third connection member, and of course, the cap 1 and the insulating member 5 may be directly welded and fixed without using the third connection member. If the cap 1 and the insulating member 5 are welded and fixed through the third connection member, a third annular protrusion structure should be provided at the contact position, and the third connection member should be arranged around the third annular protrusion.

It is to be noted that the material of the first connection member, the second connection member and the third connection member is not specifically required and particularly limited but may be a metal material, and any connection member capable of achieving the sealing effect is applicable to the present application as long as it is commonly used by those skilled in the art.

The thickness of a portion, extending into the groove of the insulating member, of the cap 1 is greater than the thickness of a remaining portion of the cap 1, and the upper end surface of the cap 1 is flush with the upper end surface of the housing 10.

Optionally, an outer rim that is folded towards the opening of the housing 10 is provided on the peripheral outer edge of the cap 1, the outer rim is attached to the opening of the housing 10, and the height of the outer rim is 0.02-0.08 mm. The provision of the outer rim can enable the outer edge of the cap 1 to be better attached to the opening of the housing 10, thereby facilitating the improvement of the sealing performance and, in particular, facilitating the connection by welding.

The sealing device further includes a false head 2, and the false head 2 is provided on the upper end surface of the pole 3 and is connected to the pole 3 and the metal ring 4 respectively.

The cell includes a positive electrode plate 11, a separator 8 and a negative electrode plate 9. The separator 8 is located between the positive electrode plate 11 and the negative electrode plate 9. The positive electrode plate 11 includes a positive electrode current collector, a bonding layer and a positive electrode material layer, where the bonding layer and the positive electrode material layer are sequentially located on the surface of the positive electrode current collector. The positive electrode current collector includes a foil-free area, and the foil-free area is welded with a positive electrode tab 6. The negative electrode plate 9 includes a negative electrode current collector and a negative electrode material layer on the surface of the negative electrode current collector, the negative electrode current collector includes a foil-free area, and the foil-free area is welded with a negative electrode tab 7. Of course, the preceding foil-free areas of the positive electrode current collector and the negative electrode current collector may be directly used as the tabs without additionally welding conductor to as the tabs.

The bonding layer includes a first binder, and the positive electrode material layer includes a second binder, a conductive agent, a positive electrode active material and a lithium-rich compound. The thickness of the bonding layer is optionally 0.5-10 μm.

The conductive agent includes a first conductive agent and a second conductive agent, the first conductive agent includes at least one of graphite powder, conductive carbon black or acetylene black, and the conductive carbon black includes small-particle conductive carbon black having a particle size of 10-200 nm and/or large-particle conductive carbon black having a particle size of 1-30 μm. The second conductive agent includes at least one of a graphene-type material and a one-dimensional carbon material, wherein the graphene-based material includes any one or a combination of at least two of graphene, oxidized graphene or doped graphene, and the one-dimensional carbon material includes carbon nanotube and/or carbon fiber.

The positive electrode active material includes a lithium-containing positive electrode active material and a carbon-based positive electrode active material. The lithium-containing positive electrode active material includes any one or a combination of at least two of lithium cobaltate, lithium nickelate, lithium manganate, lithium iron phosphate, a nickel-cobalt-manganese ternary material, a nickel-cobalt-aluminum ternary material or a nickel-cobalt-manganese-aluminum quaternary material. The carbon-based positive electrode active material includes any one or a combination of at least two of activated carbon, graphene, doped graphene or porous biochar.

In the positive electrode material layer, the mass ratio of the graphene-based material to the one-dimensional carbon material is (1-2):(3-6), and the first binder and the second binder are fusible fluorocarbon resin. The first binder and the second binder are independently selected from any one or a combination of at least two of PVDF, PTFE or PFA. The lithium-rich compound includes any one or a combination of at least two of $Li_2NiO_2$, $LiSFeO_4$, $Li_3N$, $Li_2O$, $Li_2O_2$ or M/fluorine lithium composition, wherein M includes any one or a combination of at least two of Co, Ni or Fe, optionally any one or a combination of at least two of $Li_2NiO_2$, $Li_3N$ or M/fluorine lithium composition.

The bonding layer further includes a third conductive agent, and the third conductive agent is optionally conductive carbon black. The total mass fraction of the first binder and the second binder is 2%-10% based on the total mass of the bonding layer and the positive electrode material layer being 100%. The mass fraction of the first conductive agent is 1%-6% based on the total mass of the bonding layer and the positive electrode material layer being 100%. The total mass fraction of the graphene-based material to the one-dimensional carbon material is 0.5%-3% based on the total mass of the bonding layer and the positive electrode material layer being 100%. The mass ratio of the third conductive agent to the first binder is optionally (1-5):1. The mass fraction of the lithium-containing positive electrode active material is 5%-80% based on the total mass of the bonding layer and the positive electrode material layer being 100%. The mass fraction of the carbon-based positive electrode active material is 10%-90% based on the total mass of the bonding layer and the positive electrode material layer being 100%. The mass fraction of the positive electrode active material is 85%-95% based on the total mass of the bonding layer and the positive electrode material layer being 100%. The mass ratio of the lithium-containing positive electrode active material to the carbon-based positive electrode active material is 1:(0.5-1.5). The mass fraction of the lithium-rich compound is 2%-30% based on the total mass of the bonding layer and the positive electrode material layer being 100%.

The negative electrode plate 9 includes a negative electrode current collector and a negative electrode material layer on the surface of the negative electrode current collector. The negative electrode material layer includes a binder, a conductive agent and a negative electrode active material. The negative electrode active material in the negative electrode material layer includes any one or a combination of at least two of graphite, amorphous carbon, silicon-carbon, silicon-oxygen, lithium titanate, graphene, tin oxide or tin alloy. The binder in the negative electrode material layer includes any one or a combination of at least two of PVDF, PTFE or an acrylonitrile multicomponent copolymer.

Example 1

This example provides a manufacturing method for the capacitor described in the specific embodiment, and the capacitor is a hybrid capacitor. The method includes the following steps:
(1) graphite powder, PVDF, activated carbon, lithium cobaltate and $Li_2NiO_2$ were dry blended for 3 h, a mixture of graphene and carbon nanotube was added, stirred and mixed for 2 h, and NMP was added and stirred for 4 h to obtain a positive electrode slurry;

wherein, the mass fraction of graphite powder was 4%, the mass fraction of activated carbon was 40 wt %, the mass fraction of lithium cobaltate was 45 wt %, the mass fraction of the lithium-rich compound $Li_2NiO_2$ was 5%, the total mass fraction of graphene and carbon nanotube was 1%, and the mass ratio of graphene to carbon nanotube was 1:4;

(2) a PTFE dispersion having a mass fraction of 3% was coated on the surface of a current collector, where the total mass fraction of PVDF and PTFE was 5 wt %, and baked at 90° C. to prepare a conductive bonding layer whose thickness was controlled to be 1 μm, and the positive electrode slurry obtained in step (1) was coated on the surface of the bonding layer and baked at 85° C. to obtain an intermediate product;

wherein, step (1) and step (2) were both performed at the ambient temperature of 25° C. and the humidity of 5%;

(3) the intermediate product obtained in step (2) was subjected to hot pressing at a temperature of 140° C. at a rolling speed of 2 m/min and baked at 140° C. under a vacuum degree of 5 Pa for 30 min to obtain a positive electrode plate;

(4) based on the total mass of the negative electrode slurry being 100%, amorphous carbon with a mass fraction of 42%, PTFE with a mass fraction of 1.4%, conductive carbon black with a mass fraction of 2.3%, citric acid with a mass fraction of 0.18%, isobutanol with a mass fraction of 0.2% and ultrapure water were stirred to obtain a negative electrode slurry with a solid content of 45.7% and a viscosity of 4500 cp, and the negative electrode slurry was coated on the surface of a copper foil and baked at 110° C. for 0.5 h to obtain a negative electrode plate 9;

(5) the positive electrode plate 11 and the negative electrode plate 9 were separated by a separator 8 and wound to obtain a cell, the cell was loaded into a housing 10, a lithium-ion electrolyte was injected, and the housing was sealed by the sealing device in Example 1 to obtain the capacitor.

Example 2

This example provides a manufacturing method for the capacitor described in the specific embodiment, and the capacitor is a hybrid capacitor. The method includes the following steps:

(1) acetylene black, PTFE, oxidized graphene, lithium manganate and $Li_3N$ were dry blended for 1 h, a mixture of graphene and carbon nanotube was added, stirred and mixed for 2 h, and NMP was added and stirred for 5 h to obtain a positive electrode slurry;

the mass fraction of acetylene black was 1%, the mass fraction of lithium manganate was 84.5 wt %, the mass fraction of graphene was 10 wt %, the mass fraction of the lithium-rich compound $Li_3N$ was 2%, the mass fraction of oxidized graphene and carbon nanotube was 0.5%, and the mass ratio of oxidized graphene to carbon nanotube was 2:3;

(2) a PVDF dispersion having a mass fraction of 8% was coated on the surface of a current collector, where the total mass fraction of PTFE and PVDF was 2 wt %, and baked at 60° C. to prepare a bonding layer whose thickness was controlled to be 0.5 μm, and the positive electrode slurry obtained in step (1) was coated on the surface of the bonding layer and baked at 80° C. to obtain an intermediate product;

wherein, step (1) and step (2) were both performed at the ambient temperature of 20° C. and the humidity of 3%;

(3) the positive electrode plate obtained in step (2) was subjected to hot pressing at a temperature of 90° C. at a rolling speed of 2 m/min and baked at 80° C. under a vacuum degree of 200 Pa for 30 min to obtain the positive electrode;

(4) based on the total mass of the negative electrode slurry being 100%, synthetic graphite with a mass fraction of 42%, PVDF with a mass fraction of 1.4%, carbon fiber with a mass fraction of 2.3%, oxalic acid with a mass fraction of 0.18%, isopropanol with a mass fraction of 0.2% and NMP were stirred to obtain a negative electrode slurry with a solid content of 45.7% and a viscosity of 4500 cp, and the negative electrode slurry was coated on the surface of a copper foil and baked at 110° C. for 0.5 h to obtain a negative electrode plate 9;

(5) the positive electrode plate 11 and the negative electrode plate 9 were separated by a separator 8 and wound to obtain a cell, the cell was loaded into a housing 10, a lithium-ion electrolyte was injected, and the housing was sealed by the sealing device in Example 2 to obtain the capacitor.

Example 3

This example provides a manufacturing method for the capacitor described in the specific embodiment, and the capacitor is a hybrid capacitor. The method includes the following steps:

(1) SP, PFA, carbon fiber, NCM811 and $Li_2O$ were dry blended for 2 h, a mixture of graphene and carbon nanotube was added, stirred and mixed for 3 h, and NMP was added and stirred for 5 h to obtain a positive electrode slurry;

wherein, the mass fraction of SP was 3 wt %, the mass fraction of graphene and carbon nanotube was 1.5 wt %, the mass ratio of graphene to carbon nanotube was 2:4, the mass fraction of NCM811 was 35 wt %, the mass fraction of carbon fiber was 45 wt %, and the mass fraction of $Li_2O$ was 10.5%;

(2) a PFA dispersion having a mass fraction of 4% was coated on the surface of a current collector and baked at 120° C. to prepare a bonding layer whose thickness was controlled to be 5 μm, and the positive electrode slurry obtained in step (1) was coated on the surface of the bonding layer and baked at 120° C. to obtain an intermediate product;

wherein, step (1) and step (2) were both performed at the ambient temperature of 25° C. and the humidity of 5%;

(3) the positive electrode plate obtained in step (2) was subjected to hot pressing at a temperature of 150° C. at a rolling speed of 25 m/min and baked at 120° C. under a vacuum degree of 100 Pa for 20 min to obtain a positive electrode plate 11;

(4) based on the total mass of the negative electrode slurry being 100%, natural graphite with a mass fraction of 42%, LA132 with a mass fraction of 1.4%, carbon nanotube with a mass fraction of 2.3%, acetic acid with a mass fraction of 0.1%, ethylene glycol with a mass fraction of 0.2% and NMP were stirred to obtain a negative electrode slurry with a solid content of 45.7% and a viscosity of 6000 cp, and the negative electrode slurry was coated on the surface of a copper foil and baked at 110° C. for 0.5 h to obtain a negative electrode plate 9;

(5) the positive electrode plate 11 and the negative electrode plate 9 were separated by a separator 8 and wound to obtain a cell, the cell was loaded into a housing 10, a lithium-ion electrolyte was injected, and the housing was sealed using a sealing device to obtain the capacitor.

Example 4

This example provides a manufacturing method for the capacitor described in the specific embodiment, and the capacitor is a hybrid capacitor. The method includes the following steps:
(1) acetylene black, PVDF, porous biochar, $LiNi_{0.85}Al_{0.075}Mn_{0.075}O_2$ and Co/fluorine lithium composition were dry blended for 2 h, a mixture of graphene and carbon nanotube was added, stirred and mixed for 3 h, and NMP was added and stirred for 6 h to obtain a positive electrode slurry;
wherein, the mass fraction of acetylene black was 2%, the mass fraction of porous biochar was 10 wt %, the mass fraction of $LiNi_{0.85}Al_{0.075}Mn_{0.075}O_2$ was 50 wt %, the mass fraction of Co/fluorine lithium composition was 25%, the mass fraction of graphene and carbon nanotube was 2%, and the mass ratio of graphene to carbon nanotube was 1:6;
(2) a dispersion of PTFE and acetylene black having a mass fraction of 3% was coated on the surface of a current collector and baked at 180° C. to prepare a bonding layer whose thickness was controlled to be 3 μm, and the positive electrode slurry obtained in step (1) was coated on the surface of the bonding layer and baked at 150° C. to obtain an intermediate product;
wherein, step (1) and step (2) were both performed at the ambient temperature of 30° C. and the humidity of 40%;
(3) the positive electrode plate obtained in step (2) was subjected to hot pressing at a temperature of 200° C. at a rolling speed of 50 m/min and baked at 150° C. under a vacuum degree of 60 Pa for 10 min to obtain a positive electrode plate;
(4) based on the total mass of the negative electrode slurry being 100%, synthetic graphite with a mass fraction of 42 wt %, PVDF with a mass fraction of 1.42 wt %, carbon fiber with a mass fraction of 2.3 wt %, oxalic acid with a mass fraction of 0.18 wt %, isopropanol with a mass fraction of 0.2 wt % and NMP were stirred to obtain a negative electrode slurry with a solid content of 45.72% and a viscosity of 4500 cp, and the negative electrode slurry was coated on the surface of a copper foil and baked at 110° C. for 0.5 h to obtain a negative electrode plate 9;
(5) the positive electrode plate 11 and the negative electrode plate 9 were separated by a separator 8 and wound to obtain a cell, the cell was loaded into a housing 10, a lithium-ion electrolyte was injected, and the housing was sealed using a sealing device to obtain the capacitor.

Example 5

This example provides a manufacturing method for the capacitor described in the specific embodiment, and the capacitor is a hybrid capacitor. The method includes the following steps:
(1) SP, PVDF, porous biochar, $LiNi_{0.85}Al_{0.075}Mn_{0.075}O_2$ and Ni/fluorine lithium composition were dry blended for 2 h, a mixture of graphene and carbon nanotube was added, stirred and mixed for 3 h, and NMP was added and stirred for 6 h to obtain a positive electrode slurry;
wherein, the mass fraction of SP was 1%, the mass fraction of $LiNi_{0.85}Al_{0.075}Mn_{0.075}O_2$ was 5 wt %, the mass fraction of porous biochar was 87 wt %, the mass fraction of Ni/fluorine lithium composition was 3 wt %, the mass fraction of graphene and carbon nanotube was 1 wt %, and the mass ratio of graphene to carbon nanotube was 2:5;
(2) a dispersion of PTFE and SP having a mass fraction of 1% was coated on the surface of a current collector and baked at 180° C. to prepare a bonding layer whose thickness was controlled to be 10 μm, and the positive electrode slurry obtained in step (1) was coated on the surface of the bonding layer and baked at 150° C. to obtain an intermediate product;
wherein, step (1) and step (2) were both performed at the ambient temperature of 30° C. and the humidity of 40%;
(3) the positive electrode plate obtained in step (2) was subjected to hot pressing at a temperature of 270° C. at a rolling speed of 50 m/min and baked at 150° C. under a vacuum degree of 180 Pa for 10 min to obtain a positive electrode plate;
(4) based on the total mass of the negative electrode slurry being 100%, natural graphite with a mass fraction of 45%, LA132 with a mass fraction of 3%, carbon nanotube with a mass fraction of 3%, acetic acid with a mass fraction of 0.2%, ethylene glycol with a mass fraction of 0.3% and deionized water were stirred to obtain a negative electrode slurry with a solid content of 51% and a viscosity of 6000 cp, and the negative electrode slurry was coated on the surface of a copper foil and baked at 110° C. for 0.5 h to obtain a negative electrode plate 9.

Example 6

This example is only different from Example 1 in that the hot pressing in step (3) was replaced with cold pressing at 5° C.

Example 7

This example is only different from Example 1 in that the hot pressing in step (3) was replaced with cold pressing at 40° C.

Example 8

This example differs from Example 1 only in that the total mass percentage of lithium cobaltate and activated carbon was 85% as in Example 1 and the mass ratio of lithium cobaltate to activated carbon was 2.5:1.

Example 9

This example differs from Example 1 only in that the total mass percentage of lithium cobaltate and activated carbon was 85% as in Example 1 and the mass ratio of lithium cobaltate to activated carbon was 2:8.

Example 10

This example differs from Example 1 only in that the lithium-rich compound $Li_2NiO_2$ was not added in the manufacturing method provided in this example, and the mass ratio between the remaining materials in the positive electrode material layer was kept unchanged.

Example 11

This example differs from Example 1 only in that activated carbon was not added to the manufacturing method provided in this example and was replaced with an equivalent amount of lithium cobaltate.

Example 12

This example differs from Example 1 only in that the mixture of graphene to carbon nanotube was not added to the manufacturing method provided in this example and was replaced with an equivalent amount of graphite powder.

Example 13

This example differs from Example 1 only in that the bonding layer was not provided, and the content of the binder in the positive electrode material layer was kept the same as the total amount of the first binder and the second binder in Example 1.

Example 14

This example is only different from Example 1 in that oxalic acid was not used in step (4).

Example 15

This example is only different from Example 1 in that isopropanol was not used in step (4).

Example 16

This example is only different from Example 1 in that oxalic acid and isopropanol were not used in step (4).

Comparative Example 1

This comparative example is only different from Example 1 in that the sealing device 3 in the CN103078069A was used for the sealing device of the capacitor.

Comparative Example 2

This comparative example is only different from Example 1 in that a sealing device of a conventional sealing design was used for the sealing device of the capacitor.

Performance Evaluation of Capacitors

The capacitors of Examples and Comparative Examples were tested for sealing performance, energy density and −50° C. low temperature. The test methods are as follows:

Sealing performance test: The hybrid capacitor was tested in a helium mass spectrometer leak detector.

Energy density test: The hybrid capacitor was placed in an environment of 25° C. for 5 min and charged at 5 mA to 3.9 V at constant current and constant voltage, with a cutoff current of 0.5 mA; the hybrid capacitor was placed for 5 min and discharged at 5 mA to 2.2 V at constant current; then the test was finished.

Rate test: The hybrid capacitor was placed in an environment of 25° C. and charged at 5 mA in NEWARE 5V5A precision discharge cabinet at constant current and constant voltage to 3.68 V, with a cut-off current of 0.5 mA; the hybrid capacitor was placed for 5 min and subjected to pulse discharge of 1 s at 500 C rate, and the lowest voltage was recorded; then the test was finished.

−50° C. low temperature test: The hybrid capacitor was placed in an environment of −50° C. and charged at 5 mA in 5V5A fine discharge cabinet at constant current and constant voltage to 3.68 V, with a cut-off current of 0.5 mA; the hybrid capacitor was transferred to a high and low temperature tank, left to stand at −50° C. for 6 h and subjected to pulse discharge of 0.1 s at 150 C rate, and the lowest voltage was recorded; then the test was finished.

The negative electrode plates 9 in Examples and Comparative Examples were tested for peel force and film resistivity. The test methods are as follows:

Negative electrode plate peel force test: The electrode plate of a certain size was fixed on a stainless steel plate with a 3M double-sided binder tape, in which a pressure-sensitive 3M-VHB double-sided binder tape was attached to the surface of the electrode and the other side was attached to the stainless steel plate, and the stainless steel plate and the current collector were fixed in two clamps of a tensile tester and then subjected to a 180-degree peel test at a speed of 10 mm/min and a load of 10 N until the current collector was completely peeled off.

Negative electrode plate film resistivity test: The film resistivity of Examples and Comparative Examples was tested using a four-point probe method, where the thickness of the coating layer was uniformly controlled to be 40 μm.

The test results are shown in Table 1.

TABLE 1

| | Full sealing performance (Pa · m²/s) | Capacity (mAh) | Negative electrode plate peel force (N) | Negative electrode plate film resistivity (Ohm/mm²) | 25° C. & 500 C. voltage (V) | −50° C. & 150 C. voltage (V) |
|---|---|---|---|---|---|---|
| Example 1 | $2.0 \times 10^{-7}$ | 30 | 0.16 | 0.000015 | 3.29 | 2.7 |
| Example 2 | $2.0 \times 10^{-7}$ | 35 | 0.16 | 0.000015 | 3.6 | 2.8 |
| Example 3 | $2.0 \times 10^{-7}$ | 40 | 0.16 | 0.0000173 | 3.29 | 2.7 |
| Example 4 | $2.0 \times 10^{-7}$ | 50 | 0.15 | 0.0000151 | 3.09 | 2.6 |
| Example 5 | $2.0 \times 10^{-7}$ | 10 | 0.14 | 0.0000162 | 3.62 | 2.7 |
| Example 6 | $2.0 \times 10^{-7}$ | 30 | 0.16 | 0.000015 | 3.17 | 2.5 |
| Example 7 | $2.0 \times 10^{-7}$ | 30 | 0.16 | 0.000015 | 3.14 | 2.4 |
| Example 8 | $2.0 \times 10^{-7}$ | 32 | 0.16 | 0.000015 | 3.18 | 2.5 |
| Example 9 | $2.0 \times 10^{-7}$ | 15 | 0.16 | 0.000015 | 3.19 | 2.6 |
| Example 10 | $2.0 \times 10^{-7}$ | 27 | 0.16 | 0.000015 | 3.15 | 2.3 |
| Example 11 | $2.0 \times 10^{-7}$ | 55 | 0.16 | 0.000015 | 2.88 | 2.1 |
| Example 12 | $2.0 \times 10^{-7}$ | 29 | 0.16 | 0.000015 | 3.02 | 2.3 |
| Example 13 | $2.0 \times 10^{-7}$ | 30 | 0.16 | 0.000015 | 2.98 | 2.3 |

TABLE 1-continued

|  | Full sealing performance (Pa·m²/s) | Capacity (mAh) | Negative electrode plate peel force (N) | Negative electrode plate film resistivity (Ohm/mm²) | 25° C. & 500 C. voltage (V) | −50° C. & 150 C. voltage (V) |
|---|---|---|---|---|---|---|
| Example 14 | $2.0 \times 10^{-7}$ | 30 | 0.09 | 0.0000192 | 2.95 | 2.4 |
| Example 15 | $2.0 \times 10^{-7}$ | 30 | 0.10 | 0.0000180 | 2.97 | 2.5 |
| Example 16 | $2.0 \times 10^{-7}$ | 30 | 0.08 | 0.0000200 | 2.88 | 2.2 |
| Comparative Example 1 | $5.0 \times 10^{-7}$ | 30 | 0.16 | 0.000015 | 3.29 | 2.7 |
| Comparative Example 2 | $9.0 \times 10^{-7}$ | 30 | 0.16 | 0.000015 | 3.29 | 2.7 |

Note:
In the table, the 25° C. & 500 C. voltage represents the lowest voltage tested at 25° C. with a current of 500 C., and the −50° C. & 150 C. voltage represents the lowest voltage tested at −50° C. with a current of 150 C.

The higher the 25° C.&500 C voltage, the better the room temperature rate capability of the material;
the higher the −50° C.&150 C voltage, the better the low temperature rate capability of the material.

The batteries prepared in Examples and Comparative Examples of the present application were of the same model (15500). The higher the capacity, the higher the energy density.

The following can be seen from Table 1.

(1) As can be seen from Examples 1 to 16, the capacitors prepared in Example 1-16 had good sealing performance.
(2) As can be seen from Examples 1, 8 and 9, the addition amounts of lithium-containing positive electrode active substances and the carbon-based active substances had an important effect on the capacity, room temperature rate capability and low temperature rate capability of the material, and when the mass ratio of lithium-containing positive electrode active substances to the carbon-based positive electrode active substances was in the optional range of 1:(0.5-1.5), the effects of the above two aspects can be achieved.
(3) As can be seen from Examples 1 and 10, since the positive electrode of Example 10 did not contain $Li_2NiO_2$, the capacity, room temperature rate capability and low temperature rate capability were all decreased, indicating that when the positive electrode contains $Li_2NiO_2$, the energy density, room temperature rate capability (25° C.&500 C voltage (V)) and low temperature rate capability (−50° C.&150 C voltage) of the hybrid capacitor can be improved.
(4) As can be seen from Examples 1 and 11, since the positive electrode active material of Example 11 was all lithium cobaltate, although the capacity was high, the rate capabilities were poor, indicating that when the positive electrode contains activated carbon and lithium cobaltate, the capacitor can obtain high energy density, good room temperature rate capability and good low temperature rate capability.
(5) As can be seen from Examples 1 and 12, since the positive electrode of Example 12 did not contain the mixture of graphene to carbon nanotube and used graphite powder instead, the capacity, room temperature rate capability and low temperature rate capability were decreased, indicating that when the positive electrode contains the mixture of graphene to carbon nanotube, the energy density, room temperature rate capability and low temperature rate capability of the hybrid capacitor can be improved.
(6) As can be seen from Examples 1 and 13, since Example 13 was not provided with a bonding layer, the room temperature rate capability and low temperature rate capability were decreased, indicating that the bonding layer provided between the positive electrode material layer and the current collector can improve the room temperature rate capability and low temperature rate capability of the hybrid capacitor.
(7) As can be seen from Examples 1 and 14 to 16, since a suitable amount of weak acid and alcohol was added to the negative electrode of Example 1, the negative electrode peel force was increased, and the negative electrode plate resistivity was decreased, because the weak acid enhanced the adhesion of the electrode material to the current collector and decreased the internal resistance of the electrode plate; the alcohol improved the compatibility of the negative electrode active substance and the binder and catalyzed the net crosslinking of the binder to improve the bonding strength so that the surface of the obtained negative electrode plate was uniformly dispersed.
(8) As can be seen from Example 1 and Comparative Examples 1 to 2, the sealing performance of Example 1 was superior to that of Comparative Examples 1 to 2 because Example 1 adopted the sealing cover assembly designed in the present application and the stepped multiple welding enhanced the sealing performance.

In conclusion, for the capacitor provided in the present application, with the use of the sealing device, full sealing is achieved, and the sealing performance is less than 10-6 Pa·m²/s (helium mass spectrometry) so that the capacitor has excellent sealing performance and can be stored at 85° C.&85% RH; for the manufacturing method for the capacitor provided in the present application, with the improvement of the positive electrode and/or the negative electrode, the extreme operating temperature performance of the capacitor can be improved, and the capacitor can be discharged at a large rate at −50° C.-125° C. so that the prepared capacitor has a high energy density and a wide operating temperature range and can meet the requirements of the industrial IoT.

The applicant has stated that although the detailed structure characteristics of the present application are described through the examples described above, the present application is not limited to the detailed structure characteristics described above, which means that the implementation of the present application does not necessarily depend on the detailed structure characteristics described above.

What is claimed is:

1. A capacitor, comprising a housing, a cell located in the housing and a sealing device located at an opening of the housing, wherein the sealing device is connected to the cell;
   the sealing device comprises a pole, and a metal ring and an insulating member are sequentially sleeved on the outer periphery of the pole from top to bottom;
   a first annular engagement surface is provided downwardly from the top on the outer peripheral surface of the pole, a second annular engagement surface is provided downwardly from the top on the inner peripheral surface of the metal ring, and the first annular engagement surface and the second annular engagement surface are fitted to and engaged with each other;
   a groove having an outward opening is provided along the radial direction of the insulating member, and a cap is provided in the groove;
   wherein the first annular engagement surface and the second annular engagement surface each have a stepped structure;
   the number of steps of the first annular engagement surface is greater than or equal to 2;
   the number of steps of the second annular engagement surface is greater than or equal to 2;
   the number of steps of the second annular engagement surface is equal to the number of steps of the first annular engagement surface;
   the first annular engagement surface is fixedly connected to the second annular engagement surface in a manner of fusion welding after the first annular engagement surface and the second annular engagement surface are fitted to and engaged with each other.

2. The capacitor according to claim 1, wherein the pole comprises a pole body and a base fixed at the bottom of the pole.

3. The capacitor according to claim 2, wherein an annular protrusion is provided on the upper end surface of the base, and an annular groove matching the position of the annular protrusion is provided on the lower end surface of the insulating member.

4. The capacitor according to claim 2, wherein the pole body and the base are integrally shaped;
   optionally, a first annular protrusion is provided on a side, towards the insulating member, of the outer peripheral surface of the base, a first connection member is provided along the outer periphery of the first annular protrusion, and the base is fixed with the insulating member through the first connection member;
   optionally, a fixing manner of the base and the insulating member comprises welding and/or sticking;
   optionally, the lower end surface of the base is connected to the cell, and the connecting manner optionally comprises any one or a combination of at least two of laser welding, ultrasonic welding or twist welding.

5. The capacitor according to claim 1, wherein a material of the pole comprises metal whose redox potential is higher than the redox potential of iron and/or alloy, optionally is any one or a combination of at least two of aluminum, molybdenum, aluminum alloy or molybdenum alloy;
   optionally, a material of the insulating member comprises any one or a combination of at least two of insulating ceramics, an insulating paint or mica;
   optionally, a material of the metal ring comprises any one or combination of at least two of aluminum alloy, stainless steel alloy or molybdenum alloy.

6. The capacitor according to claim 1, wherein the number of steps of the first annular engagement surface is 2-10; and the number of steps of the second annular engagement surface is 2-10.

7. The capacitor according to claim 1, wherein the cell comprises a positive electrode plate and a negative electrode plate;
   optionally, the positive electrode comprises a positive electrode current collector, a bonding layer and a positive electrode material layer, wherein the bonding layer and the positive electrode material layer are sequentially located on the surface of the positive electrode current collector;
   optionally, the bonding layer comprises a first binder, and the positive electrode material layer comprises a second binder, a conductive agent, a positive electrode active material and a lithium-rich compound.

8. The capacitor according to claim 7, wherein a thickness of the bonding layer is 0.5-10 µm;
   optionally, the conductive agent comprises a first conductive agent and a second conductive agent, the first conductive agent comprises at least one of graphite powder, conductive carbon black or acetylene black, and the second conductive agent comprises at least one of a graphene-based material and a one-dimensional carbon material;
   optionally, the positive electrode active material comprises a lithium-containing positive electrode active material and a carbon-based positive electrode active material;
   optionally, the lithium-containing positive electrode active material comprises any one or a combination of at least two of lithium cobaltate, lithium nickelate, lithium manganate, lithium iron phosphate, a nickel-cobalt-manganese ternary material, a nickel-cobalt-aluminum ternary material or a nickel-cobalt-manganese-aluminum quaternary material;
   optionally, the carbon-based positive electrode active material comprises any one or a combination of at least two of activated carbon, graphene, doped graphene or porous biochar;
   optionally, the conductive carbon black comprises small-particle conductive carbon black having a particle size of 10-200 nm and/or large-particle conductive carbon black having a particle size of 1-30 µm;
   optionally, the graphene-based material comprises any one or a combination of at least two of graphene, oxidized graphene or doped graphene;
   optionally, the one-dimensional carbon material comprises carbon nanotube and/or carbon fiber;
   optionally, in the positive electrode material layer, the mass ratio of the graphene-based material to the one-dimensional carbon material is (1-2):(3-6);
   optionally, the first binder and the second binder are fusible fluorocarbon resin;
   optionally, the first binder and the second binder are independently selected from any one or a combination of at least two of PVDF, PTFE or PFA;
   optionally, the lithium-rich compound comprises any one or a combination of at least two of $Li_2NiO_2$, $LisFeO_4$, $Li_3N$, $Li_2O$, $Li_2O_2$ or M/fluorine lithium composition, wherein M comprises any one or a combination of at least two of Co, Ni or Fe.

9. The capacitor according to claim 8, wherein a total mass fraction of the graphene-based material to the one-dimensional carbon material is 0.5%-3% based on the total mass of the bonding layer and the positive electrode material layer being 100%;

optionally, a mass fraction of the lithium-containing positive electrode active material is 5%-80% based on the total mass of the bonding layer and the positive electrode material layer being 100%;
optionally, a mass fraction of the carbon-based positive electrode active material is 10%-90% based on the total mass of the bonding layer and the positive electrode material layer being 100%;
optionally, the mass ratio of the lithium-containing positive electrode active material to the carbon-based positive electrode active material is 1:(0.5-1.5).

10. The capacitor according to claim 7, wherein the bonding layer further comprises a third conductive agent, and the third conductive agent is optionally conductive carbon black;
optionally, a total mass fraction of the first binder and the second binder is 2%-10% based on the total mass of the bonding layer and the positive electrode material layer being 100%;
optionally, a mass fraction of the first conductive agent is 1%-6% based on the total mass of the bonding layer and the positive electrode material layer being 100%;
optionally, a mass ratio of the third conductive agent to the first binder is (1-5):1;
optionally, a mass fraction of the positive electrode active material is 85%-95% based on the total mass of the binder and the positive electrode material layer being 100%;
optionally, the mass fraction of the lithium-rich compound is 2%-30% based on the total mass of the bonding layer and the positive electrode material layer being 100%.

11. The capacitor according to claim 7, wherein the negative electrode plate comprises a negative electrode current collector and a negative electrode material layer on the surface of the negative electrode current collector;
optionally, the negative electrode material layer comprises a binder, a conductive agent and a negative electrode active material;
optionally, the negative electrode active material in the negative electrode material layer comprises any one or a combination of at least two of graphite, amorphous carbon, silicon-carbon, silicon-oxygen, lithium titanate, graphene, tin oxide or tin alloy;
optionally, the binder in the negative electrode material layer comprises any one or a combination of at least two of PVDF, PTFE or an acrylonitrile multicomponent copolymer.

12. A manufacturing method for the capacitor according to claim 1, comprising the following steps:
(1) mixing a second binder, a conductive agent, a positive electrode active material and a lithium-rich compound to obtain a positive electrode slurry, wherein the conductive agent comprises a first conductive agent and a second conductive agent, the first conductive agent comprises at least one of graphite powder, conductive carbon black or acetylene black, and the second conductive agent comprises at least one of a graphene-based material and a one-dimensional carbon material;
(2) coating a dispersion liquid containing a first binder on the surface of a positive electrode current collector, performing a first baking to prepare a bonding layer, coating the positive electrode slurry obtained in step (1) on the surface of the bonding layer, performing a second baking to obtain an intermediate product, rolling the intermediate product, and performing a third baking on the intermediate product to obtain a positive electrode plate;
(3) mixing a negative electrode active material, a solvent, a binder, a conductive agent, a weak acid and an alcohol to obtain a negative electrode slurry, coating the negative electrode slurry on the surface of a negative electrode current collector, and performing baking to obtain a negative electrode plate;
the weak acid comprises any one or a combination of at least two of oxalic acid, acetic acid or citric acid;
the alcohol comprises any one or a combination of at least two of isopropanol, isobutanol or ethylene glycol;
(4) preparing the positive electrode plate and the negative electrode plate into the cell, loading the cell into the housing, injecting an electrolyte, and sealing the cell using the sealing device to obtain the capacitor.

13. The manufacturing method for the capacitor according to claim 12, wherein the positive electrode current collector in step (2) comprises any one of an etched current collector, a coated current collector, a pure current collector or a through-hole current collector;
optionally, in the dispersion in step (2), a mass fraction of the binder is 1%-10%;
optionally, the dispersion liquid in step (2) further comprises a third conductive agent;
optionally, a temperature of the first baking in step (2) is 60° C.-180° C.;
optionally, a thickness of the bonding layer in step (2) is 0.5-10 μm;
optionally, a temperature of the second baking in step (2) is 80° C.-150° C.;
optionally, a rate of the rolling in step (2) is 2-50 m/min;
optionally, a manner of the rolling in step (2) is cold pressing and/or hot pressing;
optionally, a temperature of the cold pressing is 0° C.-45° C.;
optionally, a temperature of the hot pressing is 60° C.-270° C.;
optionally, a manner of the third baking in step (2) comprises vacuum baking;
optionally, a vacuum degree of the vacuum baking in step (2) is 5-200 Pa;
optionally, a temperature of the third baking in step (2) is 80° C.-150° C.;
optionally, a time of the third baking in step (2) is 10-60 min;
optionally, in the process of steps (1) and (2), the ambient temperature is controlled to be 20° C.-30° C., and the humidity is controlled to be 3%-40%;
optionally, in step (3), a mass fraction of the negative electrode active material is 40%-45%, a mass fraction of the binder is 1.2%-3%, the mass fraction of the conductive agent is 1.5%-3%, a mass fraction of the weak acid is 0.1%-0.2%, a mass fraction of the alcohol is 0.2%-0.3%, and a mass fraction of the solvent is 45%-60%, based on the total mass of the negative electrode slurry being 100%.

14. The capacitor according to claim 1, wherein a second annular protrusion is provided on a side, towards the insulating member, of the outer peripheral surface of the metal ring, a second connection member is provided along the outer periphery of the second annular protrusion, and the metal ring is fixedly connected to the insulating member through the second connection member;
optionally, a fixedly connecting manner of the metal ring and the insulating member comprises welding;

optionally, a fixedly connecting manner of the insulating member and the pole comprises welding;

optionally, a third annular protrusion is provided on a side, towards the cap, of the outer peripheral surface of the insulating member, a third connection member is provided along the outer periphery of the third annular protrusion, and the insulating member is fixed with the cap through the third connection member;

optionally, a thickness of a portion, extending into the groove of the insulating member, of the cap is greater than the thickness of a remaining portion of the cap;

optionally, a fixing manner of the cap and the insulating member comprises welding;

optionally, the upper end surface of the cap is flush with the upper end surface of the housing;

optionally, an outer rim that is folded towards the opening of the housing is provided on the peripheral outer edge of the cap, and the outer rim is attached to the opening of the housing;

optionally, a height of the outer rim is 0.02-0.08 mm;

optionally, the sealing device further comprises a false head, and the false head is provided on the upper end surface of the pole and is connected to the pole and the metal ring respectively.

15. A method for using the capacitor according to claim 1 in the industrial Internet of Things.

* * * * *